United States Patent [19]

Suzuki et al.

[11] 4,241,939
[45] Dec. 30, 1980

[54] SEATBELT SYSTEM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 37,158

[22] Filed: May 8, 1979

[30] Foreign Application Priority Data

Dec. 21, 1978 [JP] Japan .................. 53-175579[U]

[51] Int. Cl.³ ............................................ B60R 21/10
[52] U.S. Cl. ................................. 280/804; 16/93 R; 297/469
[58] Field of Search ............... 280/804, 803, 802; 180/270, 268; 297/482, 483, 484, 469; 74/30, 29; 16/93 D, 93 R, 95 R, 95 D, 96; 104/93, 89, 110, 106, 165

[56] References Cited

U.S. PATENT DOCUMENTS

| | | | |
|---|---|---|---|
| 3,248,749 | 5/1966 | Williams | 16/93 D |
| 3,671,997 | 6/1972 | Sigmund | 16/93 R |
| 4,004,829 | 1/1977 | Kato et al. | 280/802 |
| 4,061,365 | 12/1977 | Nagano et al. | 280/804 |

*Primary Examiner*—John A. Pekar
*Attorney, Agent, or Firm*—Koda and Androlia

[57] ABSTRACT

A seatbelt system wherein one end of a passenger restraining belt is fastened to a runner piece. The runner piece is guided by a guide rail mounted along the body of a vehicle and the belt is automatically fastened about the passenger by being driven by a drive motor. In particular, the runner piece is further provided with slide shoes which slide along the guide rail. The slide shoes reduce the sliding resistance between the runner piece and the guide rail and therefore provide a runner piece which is small and which moves smoothly and reliably.

10 Claims, 5 Drawing Figures

SEATBELT SYSTEM

BACKGROUND OF THE INVENTION

1. Field of Invention

This invention relates to seatbelt systems and more particularly to seatbelt systems which automatically fasten and unfasten the passenger restraining belt about the passenger after he has seated himself.

2. Prior Art

Since seatbelt systems protect passengers by restraining them with a belt during vehicular emergencies, passengers in the vehicles do not collide with dangerous objects and their safety is insured. However, for reasons such as the difficulty of fastening the restraining belt, etc. the proportion of wearers of seatbelts is very low.

For this reason, passive seatbelt systems which automatically fasten the restraining belt about the passenger after he has seated himself have been proposed. These seabelt systems have a guide rail provided in or on the car body and the belt is caused to approach or move away from the seated passenger to permit automatic fastening or unfastening of the belt by means of a runner piece to which the end of the belt is attached and which is caused to move along the guide rail.

However, the runner pieces are usually connected to the guide rail by wheels and the runner piece usually includes several wheels to minimize resistance to the motion of the runner piece and make motion of the runner piece smooth. As a result of the plurality of wheels utilized by the runner piece, the external form of the runner piece and the guide rail is enlarged and forms a substantial projection into the interior of the motor vehicle. This condition is aggravated by the requirement of a strong runner piece. However, if the guide rail and runner piece are designed so that the runner piece slides directly in the guide rail to reduce the size, the smooth operation of the runner piece is impaired and comfortable and reliable automatic fastening of the belt is not afforded.

SUMMARY OF THE INVENTION

Accordingly as a general object the present invention should provide a seatbelt system which not only has an extremely small runner piece and guide rail but also guarantees smooth operation of the runner piece.

In keeping with the principles of the present invention, the objects are accomplished by a unique seatbelt system which includes a runner piece having slide shoes, the runner piece is secured to the guide rail by the slide shoes and the sliding resistance within the guide rail is minimized by these slide shoes and thereby the size of the runner piece and guide rail is decreased.

BRIEF DESCRIPTION OF THE DRAWINGS

The above mentioned features and objects of the present invention will become more apparent with reference to the following description taken in conjunction with the accompanying drawings wherein like reference numerals denote like elements, and in which.

DETAILED DESCRIPTION OF THE INVENTION

Figure 1:
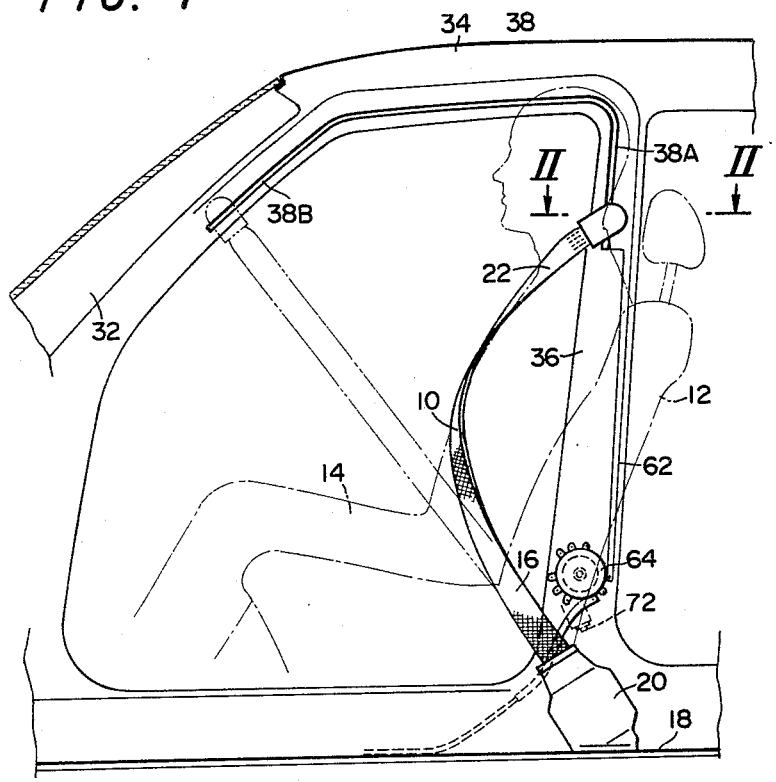
FIG. 1 is a side view from the inside of a motor vehicle showing one embodiment of a seatbelt system in accordance with the teachings of present invention.

Referring more particularly to the drawings, shown in FIG. 1 is a seatbelt system in accordance with the teachings of the present invention. In FIG. 1, the seatbelt system includes a passenger restraining belt 10 which lies diagonally across a passenger 14 seated in a passenger seat 12 to bring the passenger 14 into a belt fastened condition. The inner end 16 of the belt 10 is wound up by a retractor 20 which is fastened to floor 18 of the vehicle. The retractor 20 is mounted along the center of the vehicle and winds up the belt end by its own power. The retractor 20 further includes an inertial locking mechanism which instantly stops the unwinding of the belt 10 during a vehicular emergency.

Figure 2:
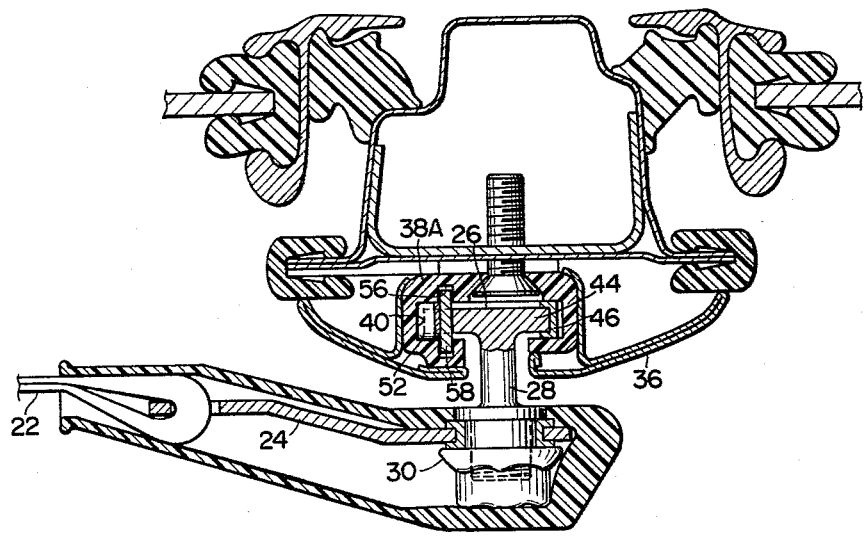
FIG. 2 is a cross sectional view along the line II—II of FIG. 1.

The outer end 22 of the belt 10 is fastened to an anchor plate 24 and as shown in FIG. 2, the anchor plate 24 is rotatably fastened by bolt 28 and nut 30 which protrudes into the interior of the vehicle to runner piece 26.

Runner piece 26 is provided in guide grooves 40 of guide rail 38 which is fastened along a front pillar 32, roof side member 34 and center pillar 36 of the vehicle. These slide grooves 40 are open along the longitudinal direction of the guide rail 38 and the runner piece 26 moves along the slide grooves 40. In this embodiment the runner piece 26 is in the form of a thin plate and by forming a rectangular cutout 42 in one portion of the runner piece 26, the runner piece 26 becomes approximately C-shaped. One side 24 of the runner piece 26 is covered by a cap-shaped upper shoe 46 while the other side pieces 48 on either side of the cutout 46 are covered with lower shoes 50 and 52 which have smaller indentations than the upper shoe 46. These lower shoes 50 and 52 are mutually connected together by connecting piece 54. The shoes 46, 50 and 52 are formed of a material having an extremely low frictional resistance, good anti-abrasion properties, excellent heat and cold resistance and stable properties. Examples of such products are synthetic resins such as Duracon (a trademark), nylon, Teflon, etc.

As shown in FIG. 2, the outer parts of the shoes 46, 50 and 52 are provided in slide groove 40 of guide rail 38 so they can move along the runner piece 26 and the runner piece 26 can move smoothly along the longitudinal direction of the guide rail 38 as a result of the low frictional resistance of the runner piece 26 which is provided by the shoes 46, 60 and 52.

As is shown in FIG. 2, tape grooves 56 are formed across guide grooves 40 at the approximate center of guide grooves 40 and drive tape 58 is provided in the tape grooves 56. As is shown in FIG. 3, drive tape 58 is long and thin with a fixed thickness and is provided with a plurality of opening 60 formed along its longitudinal direction.

Figure 3:
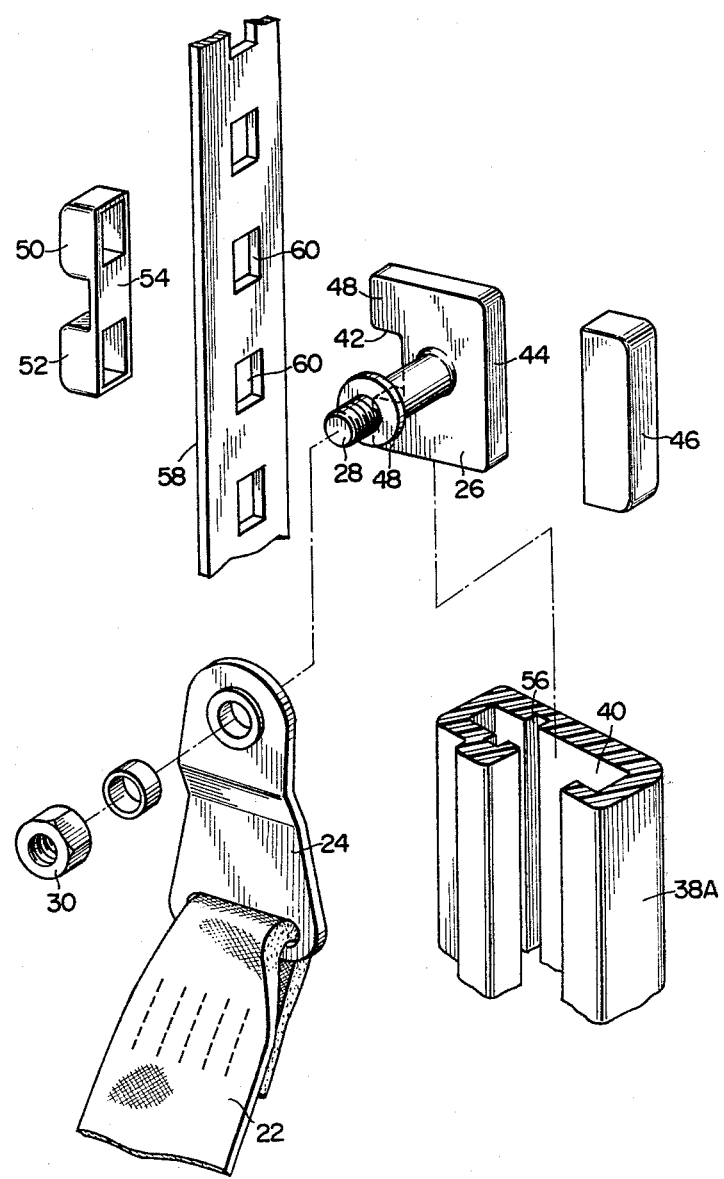
FIG. 3 is an exploded closeup view of the principle parts of FIG. 2.

As is shown in FIG. 3, opening 60 of the drive tape 58 are arranged so that the other side of the runner piece 26 can be introduced into the opening 60 and lower shoes 50 and 52 cover the other side 48 which is passed through the rectangular openings 60. As a result, when drive tape 58 moves in a longitudinal direction the guide rail 38 along slide grooves 40, it moves runner piece 26 from the vertical part 38A of guide rail 38 along center pillar 36 to the sloping part 38B along front pillar 32.

Figure 4:
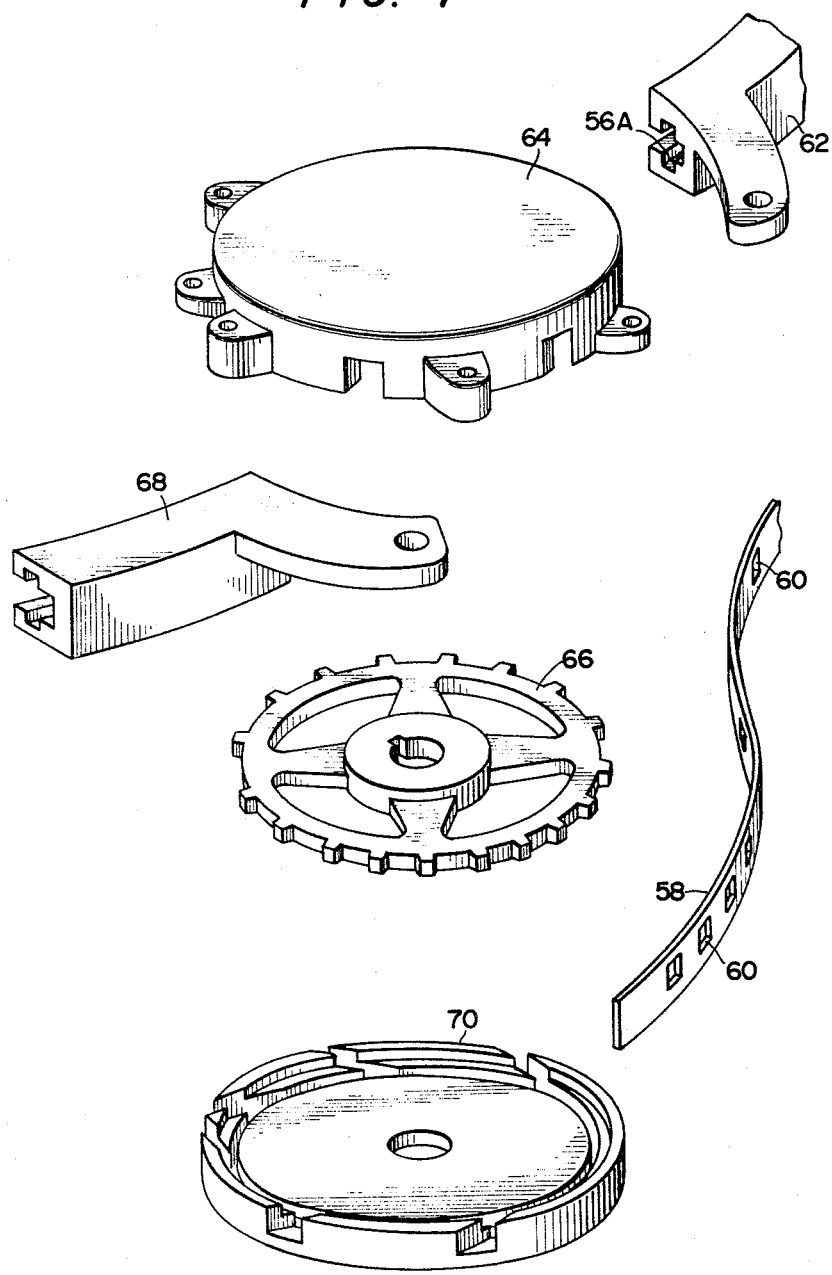
FIG. 4 is an exploded closeup view illustrating the assembly of the drive tape and sprocket wheel.

A second guide rail 62 descends from the vertical part 38A of guide rail 38 and, as shown in FIG. 4, tape grooves 56A which are connected to tape grooves 56 of guide rail 38 are formed therein. The lower end of the second guide rail 62 connects to a sprocket housing 64 which is fastened to the lower part of center pillar 36. A sprocket wheel 66 which engages with an opening 60 of drive tape 58 is mounted in the sprocket housing 64.

A third guide rail 68 is connected to the sprocket housing 64 to receive drive tape 58 which is extruded from sprocket housing 64 after it is engaged with sprocket wheel 66. Sprocket wheel 66 within sprocket housing 64 is turned by an output shaft of motor 72 which passes through lid 70 of the sprocket housing 64. Drive tape 58 is moved along the guide rail 38 and second and third guide rail 62 and 68 by the rotation of the sprocket wheel 66 to thereby drive runner piece 26.

The motor 72 is arranged to operate by sensing the entering or exiting of a passenger. For example, when a passenger closes the door after seating himself, the sprocket wheel 66 is rotated in a clockwise direction in FIG. 1 and runner piece 26 is moved towards the vertical part 38A of the guide rail 38. When the passenger opens the door, the sprocket wheel 66 rotates in a reverse direction and runner piece 26 is moved in the direction of the sloping part 38B of guide rail 38. In each case, anchor plate 24 is driven so as to reach the end of guide rail 38. For the purpose of explanation of the operation of this embodiment, FIG. 1 illustrates a passenger 14 in a seated condition and belt 10 has been automatically fastened about the passenger 14. In operation, when the passenger changes his driving position in which the belt 10 is in the fastened condition, movement of his upper body causes the inner end 16 of the belt 10 to unwind from the retractor 20 against the winding force. In such a case, since the runner piece 26 and anchor plate 24 lie in the vertical 38A of the guide rail, motion of the runner piece 26 toward the front or rear of the vehicle is prevented.

Next, during an emergency such as a collision, etc., since the unwinding of belt 10 is instantly stopped by the inertial locking mechanism within retractor 20, the passenger is securely restrained by the belt 10. That is, the outer end 22 of the belt 10 is fastened to anchor plate 24 and since the anchor plate lies in the vertical part 38A of guide rail 38 a motion towards the front or rear of the vehicle is prevented and the passenger is not thrown to the front of the vehicle and collision with dangerous objects is avoided.

Next, when a normal condition exists and the passenger exits the vehicle by opening the door, the motor 72 is caused to rotate in a clockwise direction to move drive tape 58. The movement of drive tape 58 causes runner piece 28 to move toward the sloping part 38B of guide rail 38 and is shown by the double dot interruption line of FIG. 1, the belt 10 separates itself from the passenger 14. As a result, the passenger may easily exit.

During the movement of the runner piece 26 since upper shoe 26 and lower shoes 50 and 52 slide in guide grooves 40 of guide rail 38 with a low frictional force, smooth motion of the runner piece 26 is insured.

When the passenger reenters and closes the door after seating himself, motor 72 reverses and causes runner piece 26 and anchor plate 24 to move towards the vertical part 38A of guide rail 38. As shown in FIG. 1, the passenger is again automatically fastened in by the belt 10. In this case also, shoes 46, 50 and 52 similarly permit smooth motion of the runner piece 26 along the guide rail 38.

Figure 5:
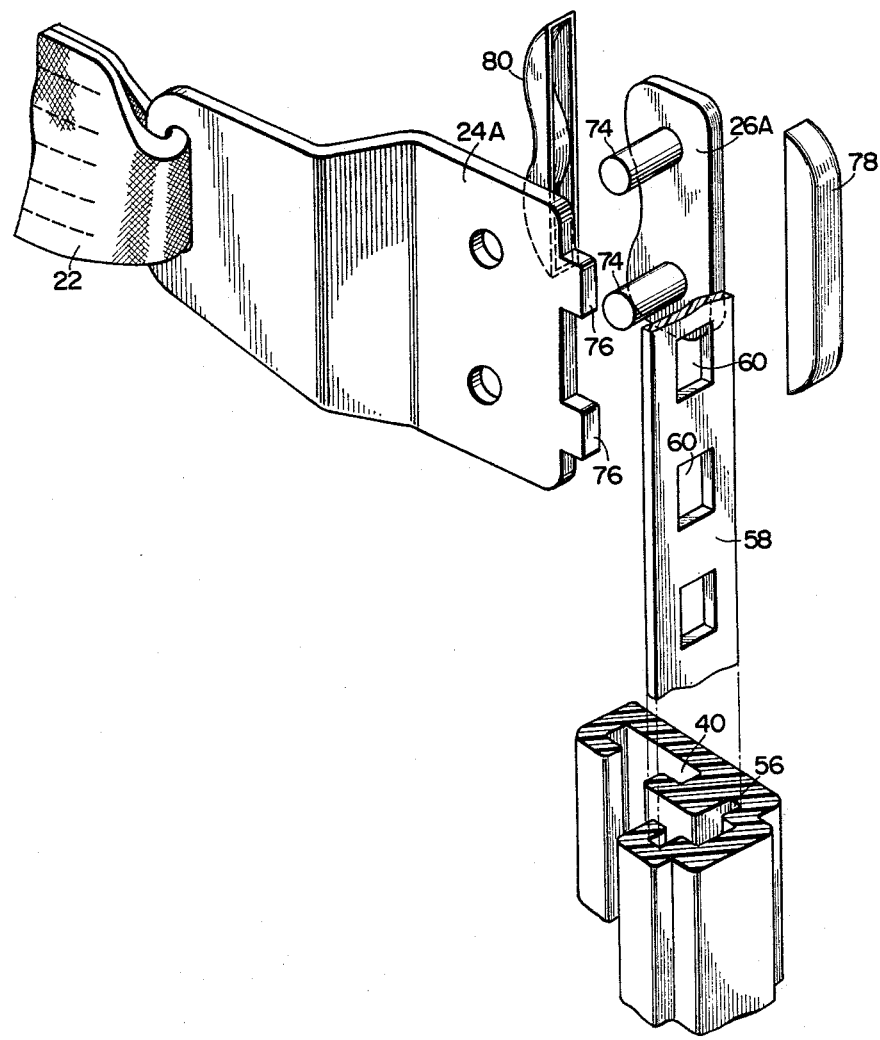
FIG. 5 is an exploded closeup view analogous to FIG. 3 creating a second embodiment of the present invention.

Referring to FIG. 5, shown therein is a second embodiment of a seatbelt system in accordance with the teachings of the present invention. In the second embodiment, runner piece 26A is riveted by means of pins 24 to anchor plate 24A so that runner piece 26A and anchor plate 24A are fastened together. Furthermore, protrusion 76 protruding from anchor plate 24A are inserted through opening 60 in the drive tape 58 so that anchor plate 24A is directly driven by the drive tape 58. Furthermore, upper shoe 78 and lower shoe 80 cover runner piece 26A so that the frictional resistance to motion of the runner piece is decreased and results similar to the first embodiment are obtained.

From the above description it is apparent that since the runner piece of the seatbelt system of the present invention is fitted with slide shoes, smooth motion of the runner piece is insured and the runner piece and guide rail may be dramtically decreased in size and excellent results obtained.

It should be apparent to those skilled in the arts that the above described embodiments are merely illustrative of but a few of the many possible specific embodiments which represent the application of the principles of the present invention. Numerous and varied other arrangements can be readily devised by those skilled in the art without departing from the spirit and the scope of the invention.

I claim:

1. A seatbelt system for automatically fastening a belt about a passenger in a motor vehicle comprising:
   a runner piece coupled to a passenger restraining belt;
   a guide rail which guides said runner piece along the body of said vehicle;
   a drive system for moving the runner piece along the guide rail and causing the belt to approach or move away from the passenger to automatically fasten or unfasten the belt about the passenger; and
   slide shoes assembled separately onto and covering said runner piece in a space between the runner piece and the guide rail whereby the slide shoes minimize frictional resistance between the guide rail and the runner piece.

2. A seatbelt system according to claim 1 wherein said belt is fastened to said runner piece by an anchor plate.

3. A seatbelt system according to claim 2 wherein said anchor plate is rotatably coupled to said runner piece by a bolt protruding from said runner piece.

4. A seatbelt system according to claim 2 wherein said slide shoes comprise an first shoe which is provided on one side of said runner piece and a second shoe which is provided on an other side of said runner piece.

5. A seatbelt system according to claim 4 wherein said first shoe and second shoe are cap shaped.

6. Seatbelt system according to claim 5 wherein said drive system comprises a flexible tape having at least one opening therein and said runner piece is coupled to said flexible tape by a protruding part which extends through said opening and said second shoe is coupled to said protruding part after said protruding part has been inserted through said opening.

7. A seatbelt system according to claim 6 wherein said first and second shoes are provided with indentions and the indention in said second shoe is as deep as the indention in said first shoe.

8. A seatbelt system according to claim 6 wherein said flexible tape is provided with a plurality of openings along its longitudinal length and said drive system further includes a sprocket which engages with said openings and a drive motor to rotate said sprocket.

9. A seatbelt system according to claim 2 wherein said drive system is coupled to said anchor plate.

10. A seatbelt system according to claim 9 further comprising projections provided on said anchor plate and said drive system includes a flexible tape having openings therein through which said projections of said anchor plate extend and a drive motor for driving said flexible tape.

* * * * *